United States Patent [19]

Yamaguchi et al.

[11] Patent Number: 4,853,524

[45] Date of Patent: Aug. 1, 1989

[54] OPTICAL IDENTIFICATION CARD SYSTEM

[75] Inventors: Masami Yamaguchi, Sagamihara; Shunichi Ishikawa, Isehara; Hideo Tamura, Hatano; Hirokazu Tanaka, Tokyo; Tomio Nakaya, Yokohama; Kiyomitsu Ishikawa, Tokyo, all of Japan

[73] Assignee: Stanley Electric Co., Ltd., Tokyo, Japan

[21] Appl. No.: 76,376

[22] Filed: Jul. 22, 1987

[30] Foreign Application Priority Data

| | | |
|---|---|---|
| Jul. 24, 1986 [JP] | Japan | 61-174256 |
| Jul. 24, 1986 [JP] | Japan | 61-174257 |
| Feb. 6, 1987 [JP] | Japan | 62-24476 |
| Feb. 6, 1987 [JP] | Japan | 62-24775 |
| Feb. 13, 1987 [JP] | Japan | 62-29908 |
| Apr. 3, 1987 [JP] | Japan | 62-81029 |
| May 13, 1987 [JP] | Japan | 62-114422 |

[51] Int. Cl.4 .................................. G06K 7/10
[52] U.S. Cl. .................. 235/468; 235/382; 235/454; 235/487; 235/491
[58] Field of Search ............ 235/380, 487, 375, 382, 235/435, 454, 455, 468, 487, 488, 491, 492

[56] References Cited

U.S. PATENT DOCUMENTS 4,202,491  5/1980  Sozuki ............................ 235/491

Primary Examiner—A. D. Pellinen
Assistant Examiner—Leon K. Fuller
Attorney, Agent, or Firm—Gifford, Groh, Sheridan, Sprinkle and Dolgorukov

[57] ABSTRACT

The present invention concerning the Optical Identification Card System is provided with an individual card which emits infrared light modulated by the individual code and a detector which receives this infrared modulated light and detects the individual code. When a request signal is radiated from this detector as infrared light from the above within the prescribed light-emitting area, the said infrared modulated light is radiated from the individual card within the light-emitting area and thus the individual code is detected by the detector. Then the detected individual code is identified by the identifier, and on the basis of this identification result, the terminal equipment related to the holder of the individual card is actuated, thereby automatically locking and unlocking the door.

11 Claims, 8 Drawing Sheets

| LC | CC | $\overline{CC}$ | DC | $\overline{DC}$ |

OPTICAL IDENTIFICATION CARD SYSTEM

BACKGROUND OF THE INVENTION

1. Field of the Invention

This invention is related to the Optical Identification Card System which detects the code of an individual card using infrared light without contacting the individual card, and performs automatic opening/closing of the door on the basis of the identification result of the individual code.

2. Prior Art

Since some time ago, it has been known that in factories, for instance, each employee is obligated to have with him an individual card having an inherent code, and when the card holder approaches the detector which has been installed at a suitable place beforehand, the detector detects the code of the individual card, thereby opening/closing the door automatically, in particular, where the secrecy of the enterprise is liable to be leaked out to the outside, persons who can enter or leave the specified room have been restricted beforehand, and unless the person in question is the holder of the individual card, it is arranged that the individual cannot enter or leave the room. This individual card incorporates a record of the inherent code, and communications between the individual card and the detector are performed, in general, by electromagnetic waves. Recently, however, the use of light is also proposed, and this method is found useful in preventing the forgery of the card.

In the said identification card system, a system is arranged so that communications are performed between the detector which is installed, for instance, on the upper part of the door and the individual card which is in the possession of the person who has approached the detector, and if the code of the individual card which has been detected by the detector is identified as a code already registered, the door will be automatically opened. In such a system, however, it is not easy to identify the code of an individual card which is in transition, and it is also difficult to identify the codes of many individual codes at the same time.

SUMMARY OF THE INVENTION

The present invention has, while paying attention to the said problems, made it possible to easily identify the code of the individual card in transition and to identify the codes of many individual cards at the same time.

Namely, the Optical Identification Card System in the present invention is provided with (1) the individual card which has an individual code and, when a request signal is received from the outside, emits infrared light which has been modulated by the individual code, (2) the detector which emits the said request signals as infrared light from the top within the prescribed light-emitting area and receives the infrared light from the said individual card, thereby detecting the individual code, and (3) the identifier which identifies the detected individual code. On the basis of the identification result, the system actuates the terminal equipment related to the holder of the said individual card, thereby performing, for instance, the automatic opening/closing of the door and giving a guide display using a display unit. The detector radiates the request signal from above over a suitable able light-emitting zone; therefore, it is easy to identify the individual card in transit. Also since infrared light is used in communications between the detector and the individual card, simultaneous identification of codes of many individual cards is possible, and centralized control on the identifier side is also easy.

BRIEF DESCRIPTION OF DRAWINGS

FIG. 4 (a) and (b) are diagrams showing examples of detector installation;

FIG. 8 (a), (b), (c) and (d) are sectional views showing the upper structures of individual cards.

FIG. 15 (a) and (b) are left-side profiles showing the layout examples of other light-emitting elements.

FIG. 6 is an oblique-view diagram showing the usage example of the display unit shown in FIG. 13.

DESCRIPTION OF PREFERRED EMBODIMENT

Figure 1:
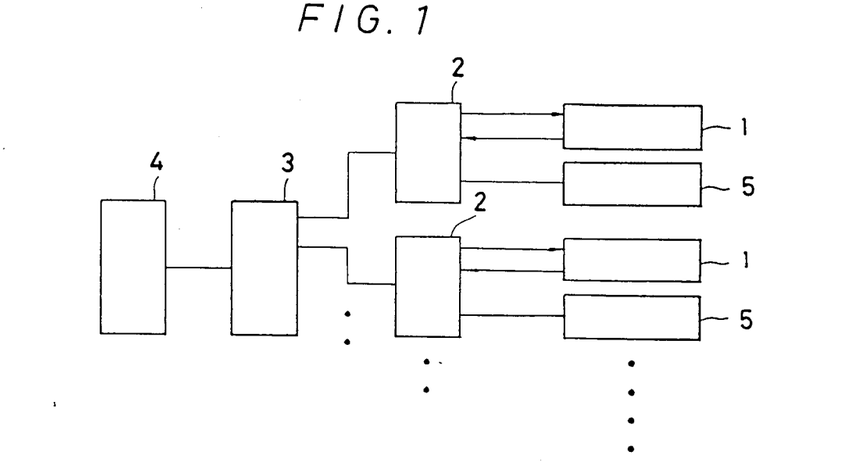
FIG. 1 is a block diagram showing the first embodiment of the present invention.

FIG. 1 is a block diagram showing the basic constitution of the Optical Identification Card System according to the first embodiment of the present invention. In the FIG. 1 is an individual card having an individual code, and radiates infrared light which has been modulated by the individual code according to the request signal from the external detector 2. Detector 2 radiates the said request signal as flickering infrared light of 100 Hz to 1 kHz from the above within the light-emitting area of the solid angle of about $\frac{1}{8}$ to $\frac{2}{3}$ steradian, see FIG. 4, and receives infrared light from the individual card 1, thereby detecting the individual code of the individual card 1. The individual code is taken by way of relay 3 into identifier 4, where the individual code is collated with data which have been stored beforehand in the identifier, and the propriety, etc., of the individual code are identified. Then terminal equipment 5 related to the holder of individual card 1 is actuated on the basis of the identification result, thereby automatically opening/closing the door.

Figure 2:
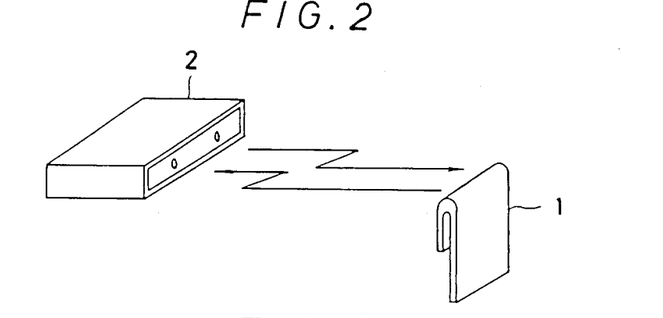
FIG. 2 is an oblique-view diagram showing the external shapes of the individual card and detector shown in FIG. 1.

The said individual card 1 has a shape, for instance, as shown in FIG. 2 and can be fitted to the breast pocket of the suit. It incorporates a power-supply source, code generator circuit, PIN photodiodes to receive and emit infrared-modulated light, and high-output infrared light-emitting diode. The detector, on the other hand, is installed at an appropriate location such as the upper part of the door, and incorporates a light-receiving and light-emitting units in the same way as with the individual card 1. Light-receiving units of these individual card 1 and detector 2 are provided with a filter each which interrupts the light of the visual light area and uses near infrared light as a signal light, thereby being unaffected by visual light and improving the S/N ratio.

Since the request signal from detector 2 is a flickering signal of 100 Hz to 1 kHz, it is possible to use an amplifier circuit employing an element whose current consumption is little during the waiting time for the individual card 1.

Figure 3:
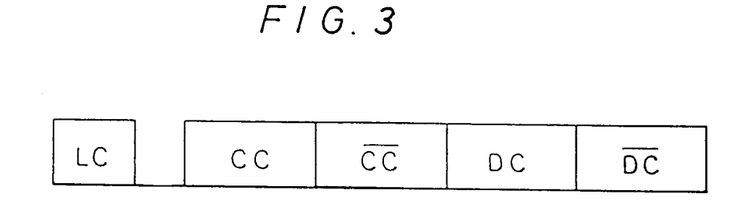
FIG. 3 is a schematic diagram of code signals sent from the individual card to the detector.

Signal light, which is outputted from the individual card 1 according to the request signal from the said detector 2, contains leader code LC, succeeding custom codes CC and $\overline{CC}$, and data codes DC and $\overline{DC}$. Leader code LC is a code which acts as a leader for starting the transmission of data, and the custom code and data code are respectively composed of eight digits. At this time, the inverted codes of the custom and data codes are decoded, and thus are collated and checked.

Identifier 4 is composed of a personal computer, etc., and installed at the centralized control room. Relay 3 is installed as and when necessary, and it is possible to install the relay at the downstream stage of detector 2.

The said system can, different from the conventional magnetic card system, automatically identify not only the individual code of a stationary individual but also an individual person (or body) which is moving at a speed of, say, 5 to 10 km/hr, since individual card 1 transmits the individual code signal using infrared light, which is emitted, as a medium, from a high-efficiency LED. When the holder of individual card 1 enters the light-emitting zone (irradiated area) of infrared light from detector 2 which has been installed at the prescribed location as a satellite, the said individual card 1 automatically emits signal light modulated by the individual code, and detector 2 which has received this signal light, detects the individual code, and sends the code signal to identifier 4. This identifier 4 collates and identifies the code signal and, according to the result, controls terminal equipment 5. During this time, all the operations ranging from detection of the individual code to identification can be controlled and also can be easily subjected to the centralized control. The use of infrared light in transmission and reception of signals also permits discrimination of the reaction area of individual card 1 and prevents interference at a location where doors are installed side by side. Namely, since the light-receiving direction can be arbitrarily set up, it is possible to identify individual codes of many persons simultaneously, by installing plural detectors 2 having different light-receiving areas. Further, detector 2 and identifier 4 may be constructed into a single solid unit.

Figure 4:
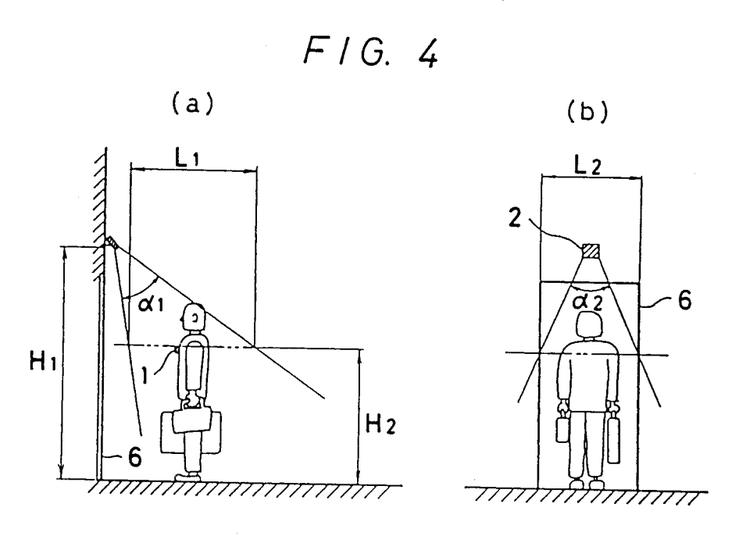

FIG. 4 (a) and (b) shows an example of installing detector 2. This is the arrangement in which detector 2 is installed at the upper part of door 6, which is automatically opened/closed. In this case, it is desirable that the height $H_1$ of detector 2 from the floor surface be about 2 to 3 m, the height $H_2$ of the individual card 1 be about 1.0 to 1.5 m, the longitudinal distance $L_1$ of the holder of individual card 1 be about 1.1 m and lateral distance $L_2$ be about 1.0 m. Further, the light-emitting area of the said detector 2 may be a solid angle range of about $\frac{1}{3}$ to $\frac{2}{3}$ steradian. In both the longitudinal (front to back) direction and lateral (right to left) direction, angles $\alpha_1$ and $\alpha_2$ will be sufficient, if they are about 1/6 to $\frac{1}{3}$ radian. Within this range, it is possible to identify without fail an individual (card holder) who is in transit.

Further, this card system can be applied not only to the automatic door opening/closing system in the factory, etc., but also to cases in which indication and voice transmission based on the identification are performed such as sorting-out of cargoes, direction for parking, indication of "No Tresspassing" mark, etc., using terminal equipment 5, and destination guide display or direction guiding announcement through a loudspeaker. Also this card system can be applied to a system for automatically finding out in which room the opposite party is located to whom you want to communicate by the telephone connection. In such a case, system expansion can be easily accomplished by changes in software, and individual card 1 can be made maintenance-free for about one year through the use of a built-in battery.

Further, if a means for displaying the contents of recording the operation of detector 2, for instance, a CRT display unit, is installed, the controlling person can take appropriate actions by viewing the display. More appropriate centralized control can be accomplished, if a signal output terminal of information is provided, which is based on the identification results, with respect to other interfaces such as the telephone exchange.

Figure 5:
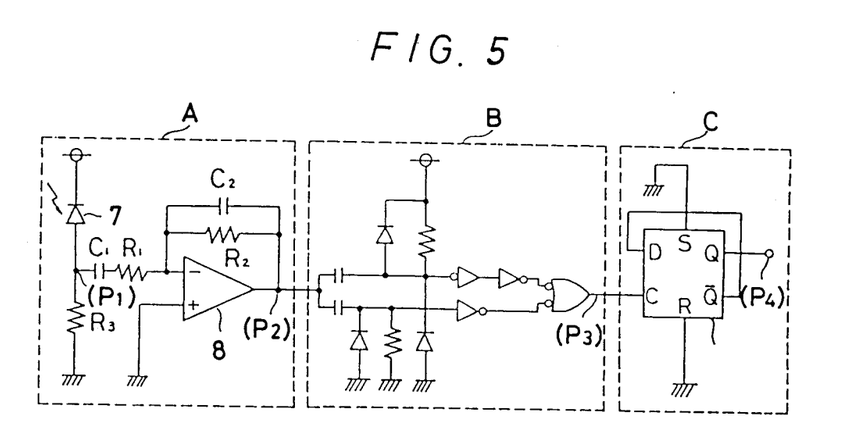
FIG. 5 shows circuit diagrams indicating the concrete examples of signal light detecting units of the individual card and detector.

FIG. 5 is a diagram showing concrete circuit composition of signal light detecting units of the said individual card 1 and detector 2. In the figure, A is a differentiating amplifier circuit which differentiates and amplifies the signal converted into an electric signal by light-receiving element 7. The differentiating circuit is composed of capacitor $C_1$ and resistance $R_1$, and an amplifier 8, capacitor $C_2$ for phase adjustment and resistance $R_2$ for feedback are connected in parallel between the input side and output side, and the light-receiving element 7 is connected in series to resistance $R_3$ for photoelectric current detecting purposes. B is a waveform shaping circuit consisting of capacitors and various logic gates, and outputs a pulse by wave-shaping the output of amplifier 3. C is a restoring circuit having a D-type flip-flop 3 which uses the pulse from the wave-shaping circuit as a trigger pulse (clock pulse), and restores the received optical signal to its original state.

Figure 6:
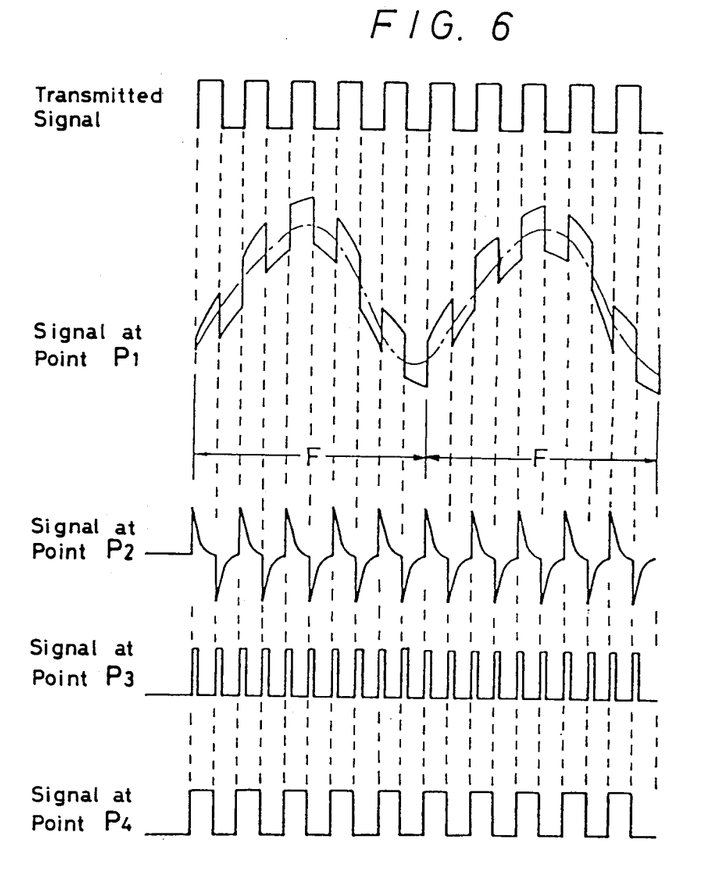
FIG. 6 shows signal waveforms at various points of the circuits shown in FIG. 5.

Since signal light from individual card 1 or detector is detected by passing through the said circuits, it is differentiated without fail from other external light. FIG. 6 shows the waveform of the optical signal, output waveform of light-receiving element 7 and waveforms of output signals of circuits A, B, and C (waveforms at points $P_1$, $P_2$, $P_3$ and $P_4$). As shown in the Figure, the output waveform of light-receiving element has a waveform in which the optical signal to be received superimposed on the signal of external light from the fluorescent lamp, etc., and has, for instance, a fraction of twice the period F of commercial frequency. Now if this signal frequency is high frequency (in general, 30 Khz or above), there is no problem, even if the LC parallel resonance circuit is used as before, because the capacity value of the resonance circuit may be small, but if the signal frequency is low frequency, a large-capacity-value resonance circuit must be used. Therefore, the present invention does not use the said resonance circuit for signal separation as shown in FIG. 5, but the output signal of light-receiving element 7 is differentiated by capacitor $C_1$ and resistance $R_1$, and the output is amplified by amplifier 8. Through the use of the differentiated output which has been obtained by taking out the rise and fall fractions of the said amplified signal pulse, signal light is separated from external light. Therefore, the signal can be separated without fail, and a large-capacity resonance circuit is unnecessary. Consequently, it is possible to make the size of the differentiating amplifier smaller and to reduce its weight, and also it is possible to remove the high frequency noise to a certain extent by setting the value of capacitor $C_2$ to an appropriate level. Further, when the ratio between the frequency of the signal light and that of external light was small, the conventional circuit was unable to separate the signal. Whereas the circuit in FIG. 5 detects the light signal using the ratio of the quantity of voltage fluctuation with respect to time, and consequently signal separation is possible, even if the ratio of frequency between the signal light and external light is small.

Figure 7:
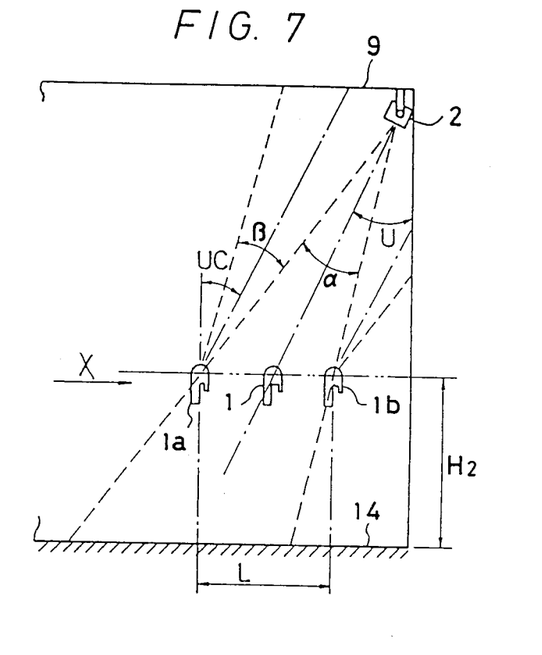
FIG. 7 shows the layout indicating the light-emitting areas of the detector and individual card.

FIG. 7 shows a diagram indicating the layout positions of detector 2 and individual card 1. Detector 2 is installed near the ceiling 9 and is arranged so that the central axis of the light-emitting area has angle U with a plane which is in parallel (vertical plane) with the wall or the door. The critical surface of the signal light emitting area of this detector 2 is similar to that of the signal light emitting area of individual card 1 in the normal supporting state as shown by broken lines in the Figure, and central axis (shown with chain lines) of the respective light-emitting ranges are nearly in parallel. Further the signal light receiving area of detector 2 will be set so that its angle will be coaxial with that of the said light emitting angle and larger. Similarly in individual card 1, its signal-receiving area will be set so that its solid angle will be coaxial with that of the said light-emitting area and larger. As a result, the communication range between the card and the detector shown by L in FIG. 7 can be set, using only respective signal light emitting areas α and β.

Figure 8A:
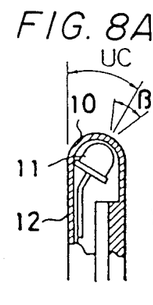

FIG. 8 shows various upper sectional structures for individual card 1. The upper part 10 of this individual card 1 is provided with the aforesaid light-emitting element 11 and light-receiving element 7, and light-emitting element 11 is installed so that the central axis of its light-emitting area will have angle UC with a plane which is in parallel with the card flank 12. Similarly, light-receiving element 7 is installed so that the central axis of its light-receiving area will have angle UC with a plane in parallel with card flank 12. Further, light-emitting element 11 itself has inherent light-emitting directional characteristics due to a lens package, and light-receiving element 7 has greater light-receiving directional characteristics than the light-emitting directional characteristics of light-emitting element 11.

Figures 8B, 8C, 8D:
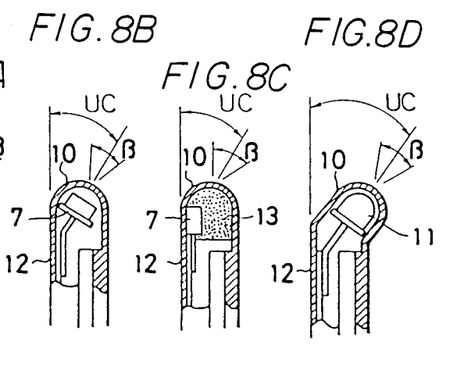

Further, the top part 10 of individual card 1 equipped with these light-emitting element 11 and light-receiving element 7 may have other structures shown in FIG. 8 (c) and (d). Namely, in the structure shown in FIG. 8 (c), light-receiving element 7 is fitted in parallel with card flank 12, the surroundings of its light-receiving surface side are filled with light transmitting resin 13, and its light-receiving directional characteristics is tilted upward by this light transmitting resin, thereby aligning its central axis of light-receiving directionality to the aforesaid angle UC. In the structure shown in FIG. 8 (d), the entire part which houses light-emitting element 11 and light-receiving element 7 is tilted at angle UC. In addition, it is possible to use combination of these structures.

Assume that individual card 1 lies, for instance, at distance $H_2$ from floor surface 14 and card flank 12 is perpendicular to floor surface 14 as shown in FIG. 7, and the communicable area. L of individual card 1 will be as shown in the figure with respect to card progressing in direction X. FIGS. 1a and 1b show individual cards which are at their communicable limit positions. Again assume that light-receiving ranges of the respective light-receiving elements of individual card 1 and detector 2 are made larger than the light-emitting areas of the respectively opposing light-emitting elements, the said detector 2 is installed at a fitting angle U and the individual card is set at a setting angle UC. Then light-emitting ranges of the respective light-emitting elements can be determined by angles U and UC.

For this reason, there is no need of turning the light-receiving and emitting surfaces towards detector 2 at every time of making transmission and reception, as long as the directionality of the light-emitting element is limited and individual card 1 is maintained in the normal state, thereby facilitating handling. At the same time, by matching the directionality of detector 2 with that of individual card 1, communications only in the area concerned become possible. Thus even if many detectors 2 are installed side by side, identification at the location concerned becomes possible by using an signal light of the identical kind (frequency).

Figure 9:
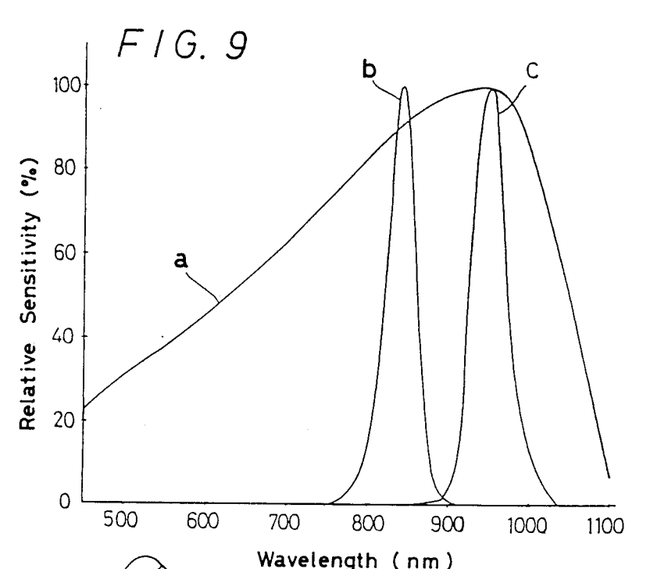
FIG. 9 is the characteristic curve diagram of the light-receiving and light-emitting elements shown in FIG. 8.

FIG. 9 is a characteristic curve diagram of light-receiving element 7 and light-emitting element 11 shown in FIG. 8. The ordinate represents relative sensitivity and the abscissa represents wavelength λ (nm).

The operating spectral characteristic of light-receiving element 7 of individual card 1 corresponds to the spectral characteristic of light irradiated from the light-receiving part of detector 2, and in particular, the light-emitting element 11 emits light with the spectral characteristic in the infrared region, namely, the light having the spectral characteristic shown by, for instance, the characteristic curve b or c. At the same time, spectral characteristics of light-receiving and light-emitting elements of detector 2 become as shown by characteristic curves a, b, and c in FIG. 9.

Now, the light-emitting element is arranged so that it will emit time-series pulses by flickering light of a single wavelength. At this time, it is possible to install plural light-emitting elements which can emit light having different wavelength, namely, a light-emitting element having a spectral characteristic shown by characteristic curve b in FIG. 9 and also a light-emitting element having a spectral characteristic shown by characteristic curve c, and to cause them to selectively flicker light with two wavelengths and emit time-series pulses containing combinations of wavelengths. It is also possible to use two or more light-emitting elements and set them so that distributions of their spectral characteristics will not overlap. Further, the detectable area can be set at an arbitrary distance by adjusting the light-emitting power of the light-emitting part of detector 2, and also can set the directionality of detecting, if the light-emitting direction of the light-emitting part is provided with directionality.

If a detecting means (not shown in the Figure) is provided which can detect the approach of a man or a substance fitted with individual card 1 and if detector is arranged so that it will output a request signal when the approach is detected, then power consumption of individual card 1 will become less and its erroneous operation will be prevented.

If individual card 1 is used by firmly securing it to the breast, shoulder or sleeve of the card user with a pin, etc., or by inserting it in the breast pocket, or the card is affixed to the outside package of the commodity to be identified, the approach of the person or substance will be detected by the detecting means (not shown in the Figure) which has been installed separately, and the light-emitting part of detector 2 will emit prescribed pulse light. Then individual card 1 receives this prescribed pulse light and, in synchronization with the signal light, emits identification pulse inherent to the individual card 1. Further, the light-receiving part of detector 2 receives this inherent identification pulse light and converts it into an identification code signal. Thus the individual code of individual card 1 is identified, and locking/unlocking, etc., of the door are accomplished automatically.

If individual card 1 receives pulse light other than the prescribed light, the card will not emit inherent identification pulse light. In addition, since the prescribed pulse light differs from the inherent identification pulse in the pulse period and interval, no problem occurs when there are plural individual cards 1, because the individual card 1 concerned will not perform erroneous operation owing to the identification pulse light from other individual card 1. At this time, only when the approach of the card is detected by the said detection means, the detector emit pulse light to operate the system.

Figure 10:
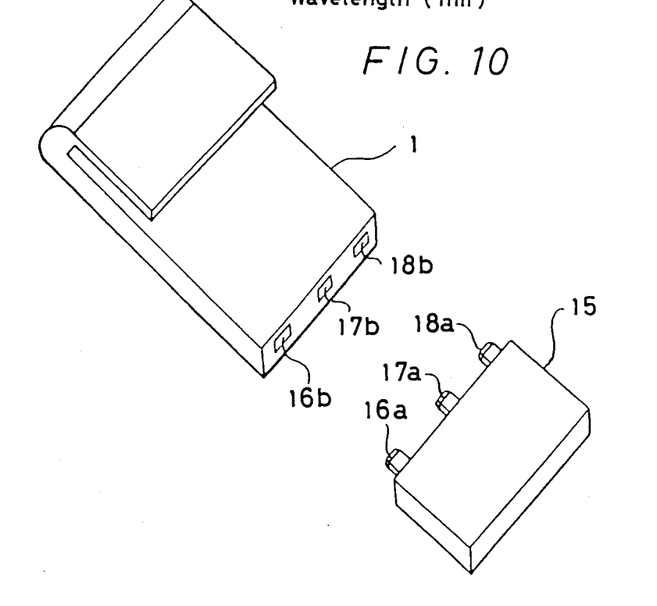
FIG. 10 is an oblique-view diagram showing the case in which the individual card is provided with connection terminals to an external auxiliary power source.

As mentioned earlier, individual card 1 remains maintenance-free for about one year by the built-in battery, but individual card 1 may be provided with connection terminals to the external auxiliary power source as shown in FIG. 10. Namely, for instance, at the bottom end of individual card 1, connection terminals 16b, 17b and 18b which are to be connected to power supply terminals 16a and 17a and positioning terminal 18a respectively of auxiliary power supply 15. This auxiliary power source 15 incorporates a battery which is sufficient to operate individual card 1 or an inverter, etc., which is to be connected to the commercial power supply. When the built-in battery of individual card 1 is exhausted, individual card 1 is automatically connected to the stand-by auxiliary power source 15 for use.

If individual card 1 is made connectable to external auxiliary power source 15 in this way, individual card 1 can be operated immediately by connecting it to auxiliary power source 14, even if the power source battery incorporated in individual card 1 has been exhausted. On top of that, this connection is very simple, and convenient, in particular, at the time of emergency when there is no time of battery replacement. Connection of auxiliary power source 15 permits easy judgment as to whether the built-in battery has been exhausted or individual card 1 itself has developed trouble, and also facilitates connection of inspection power source at the time of electric conduction inspection at the production stage of individual card 1, thereby shortening inspection time. In addition, there is no need of storing beforehand stand-by batteries at locations where identification is to be performed, thereby saving the cost for stand-by batteries and time for controlling such batteries.

Figure 11:
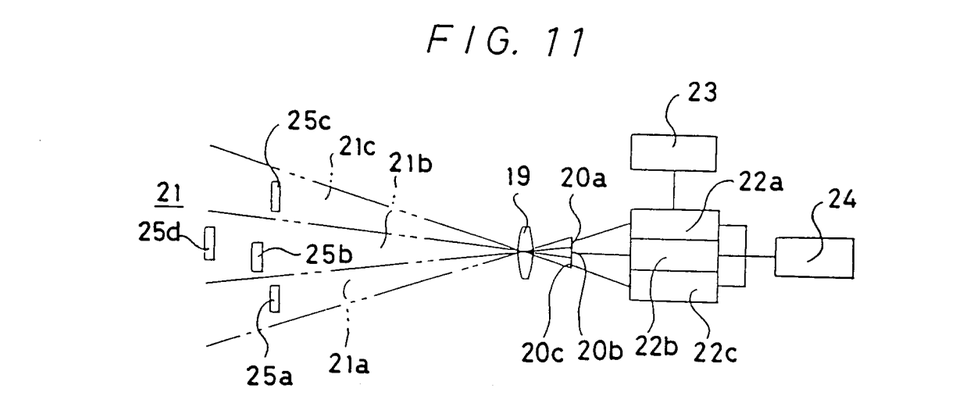
FIG. 11 is a diagram showing the second embodiment of the present invention.

FIG. 11 is a structural diagram showing the second embodiment of the present invention. In this Optical Identification Card System, the total light-receiving area of detector 2 is divided into plural unit areas, plural light-receiving elements are provided which correspond to these respective plural unit areas and a signal processing unit is provided which can individually process the light-receiving signal of the light-receiving elements.

Namely, a condensing lens 19 is provided at the front part of the detector (not shown in the Figure) which has been installed at the upper part of the door, etc., and light-receiving elements 20a, 20b, and 20c are arranged at the rear part of this condensing lens 19. These light-receiving elements 20a, 20b, and 20c receive infrared-ray signal light emitted from unit areas 21a, 21b, and 21c shown by (two-point) chain lines in FIG. 11, and the whole of these unit areas 21a, 21b and 21c forms the total light-receiving area 21.

The said light-receiving elements 20a, 20b, and 20c are connected to corresponding signal processing units 22a, 22b, and 22c respectively, and it is arranged so that infrared-ray signal light received at light-receiving elements 20a, 20b, and 20c will be processed by signal processing units 22a, 22b, and 22c, respectively. These signal processing units 22a, 22b, and 22c are connected to display unit 23 to display the results of processing by the signal processing units 22a, 22b, and 22c, and related equipment 24 is provided which operates depending upon the processing results.

Now assume that three persons having individual cards 25a, 25b, and 25c have entered the unit areas 21a, 21b, and 21c respectively. The infrared-ray signal light emitted by individual card 25a is received by light-receiving element 20a, infrared-ray signal light emitted by individual card 25b is received by light-receiving element 20b, and infrared-ray signal light emitted by individual card 25c is received by light-receiving element 20c. The respective infrared-ray signal light is processed at signal processing units 22a, 22b, and 22c which have been provided in correspondence to respective light-receiving elements 20a, 20b and 20c. As a result display unit 23 displays that, for instance, the person who is in unit area 21a is refused admittance, and persons who are in unit areas 21b and 21c are admitted entrance, and at the same time related equipment 24 is actuated to open doors for those who have been admitted entrance. At this time, plural persons may sometimes enter the unit area. For instance, when a person who carries individual card 25b and another person who carries individual card 25d enter unit area 21b, these persons will not enter unit area 21b exactly at the same time. Therefore, the infrared-ray signal light of the individual card which is carried by the first-entering person is similarly processed by the signal processing unit.

Suppose three light-receiving elements 20a, 20b, and 20c are arranged side by side, a person carrying, for instance, individual card 25a is positioned at the boundary between unit areas 21a and 21b. Thus the quantity of light received decreases in half, when the light-receiving elements 20a and 20b receive infrared-ray signal light emitted by individual card 25a, thereby by causing erroneous operation in the processing by the signal processing unit. To ensure correct signal processing even in such a case, it is desirable to install light-receiving elements, which use the extension lines of the respective boundaries as a center line, at the edges of the respective light-receiving elements. If it is not necessary at the time to have high resolution when the individual card carrying person moves in the right-to-left direction in the Figure, a cylindrical lens may be used instead of condensing lens 19.

When infrared-ray signal light is emitted on an individual-card-carrying person obliquely from above to form the total light-receiving area, its width at the near side of the detector is small, and that at the far side is large. Therefore, when light-receiving elements 20a, 20b, and 20c are arranged so that the entire light-receiving elements will form a trapezoidal area, the light-receiving area will be determined according to the shape of the irradiated area, thereby permitting more precise detection of the individual card.

Figure 12:
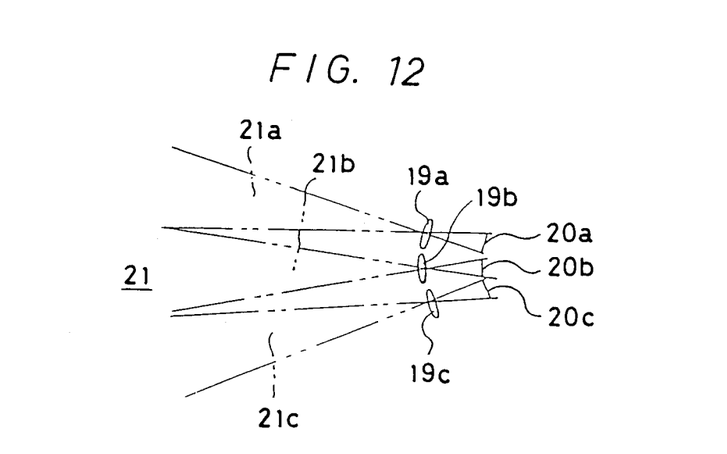
FIG. 12 is a diagram showing the case in which the respective light-receiving elements shown in FIG. 11 are provided with a condensing lens each.

In the above-example, infrared-ray signal light which has been emitted from the individual card is passed through a signal condensing lens 19, but it is possible to arrange so that infrared-signal light will pass through condensing lenses 19a, 19b, and 19c which correspond to light-receiving elements 20a, 20b, and 20c respectively as shown in FIG. 12. Further, the numbers of divided unit areas and light-receiving elements can be arbitrarily increased or decreased, and in particular, a construction will be effective in which plural light-receiving elements are installed individually and the light-receiving surface of a single light-receiving element is electrically divided into plural parts.

Through the use of the above-mentioned embodiment, it is possible to ensure identification of the code of the individual-card-carrying person even if plural persons enter the light-receiving area, and separation of signal light emitted from various individual cards becomes more certain, since light condensation, refraction, etc., are made easier by optical elements such as the condensing lens. Even when plural persons carrying individual cards enter the light-receiving area, their signal processings can be performed in parallel, thereby reducing processing time.

Figure 13:
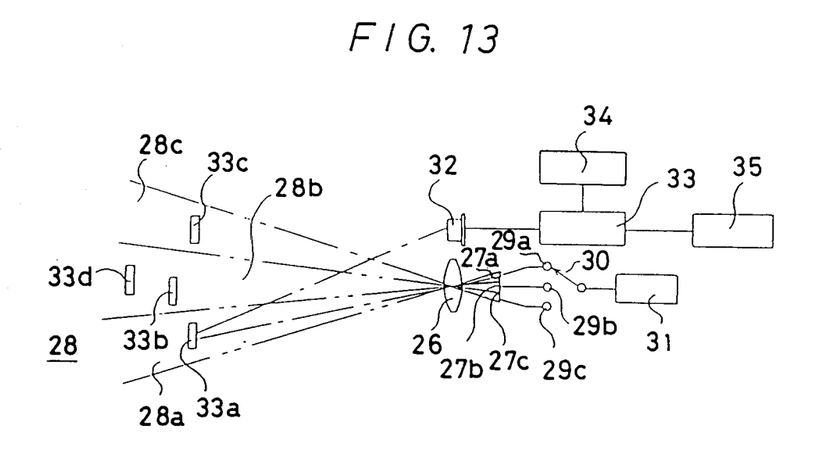
FIG. 13 shows the third embodiment of the present invention.

FIG. 13 is a structural diagram showing the third embodiment of the present invention. In this embodiment, the total light-emitting area of detector 2 is divided into plural unit areas, and irradiating means are provided which individually irradiate the unit areas at every prescribed intervals. Thus it is constructed so that the detector receives infrared-ray signal light (modulated light) from the individual card which lies in any one of the unit areas mentioned above and can detect the individual code at every unit area concerned.

In FIG. 13, 26 is a lens installed at the front 0 part of the detector fixed securely at the upper part of the door. At the rear part of this lens 26, light-emitting elements 27a, 27b, and 27c are arranged as irradiation means. These light-emitting elements 27a, 27b and 27c emit infrared-ray signal light into unit areas 28a, 28b and 28c which are indicated by (two-dot) chain lines in the Figure, and the whole of these unit areas 28a, 28b, and 28c form the total light-emitting area 28. To these light-emitting elements 27a, 27b, and 27c are connected change-over switch 30 which has incorporated respectively-corresponding fixed contacts 29a, 29b, and 29c, and this change-over switch 30 sequentially connects the light-emitting elements to power source 21, and causes the light-emitting element concerned to generate modulated light. This change-over switch may use a semiconductor switch instead of the contact switch shown in the Figure.

At the side of lens 26, on the other hand, light-receiving element 32 is installed, and signal light emitted from individual cards 33a, 33b, 33c, and 33d located in the total light-emitting area 28 is received by this light-receiving element 32, and signal light received by light-receiving element 32 is processed by this signal processing unit 33. This signal processing unit 33 is connected to display unit 34, which displays the results of the signal processing. Related equipment 35 is also provided which operates according to the judgment at the signal processing unit 20.

Figure 14:
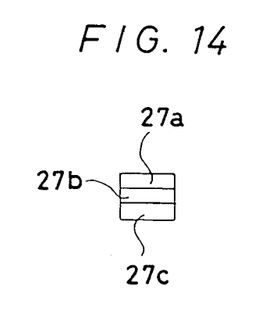
FIG. 14 shows the left-side profile of the light-emitting element shown in FIG. 13.

FIG. 14 shows concrete examples of the said light-emitting elements 27a, 27b, and 27c. This FIG. 14 shows the states of light-emitting elements 27a, 27b, and 27c shown in FIG. 13, viewed from the left direction of this Figure.

Next, the operation of the said embodiment will be explained. In the same way as with the preceding embodiment, assume that persons who are carrying individual cards 33a, 33b, and 33c have entered unit areas 28a, 28b, and 28c respectively. First when change-over switch 30 is connected to fixed contact 29a, modulated light of light-emitting element 27a which has been fed from power supply 31 irradiates unit area 28a. As a result, individual card 33a which is in unit area 28a receives the modulated light and emits infrared-ray signal light which has been further modulated by the inherent code. This signal light is received by light-receiving element 32, converted into an electric signal and then sent out to signal processing unit 33. Upon receiving the signal, the signal processing unit 33 detects and identifies the individual code of individual card 33a, judges the status, etc., of the person carrying the individual card 33a, and further, on the basis of the judgment result, operates related equipment 35. For instance, when signal processing unit 33 recognizes that the person carrying individual card 33a is a proper person, a display is shown which indicates that he is admitted entrance, and the door is unlocked. If the person is found unsuitable, it is displayed that he is refused admittance, and the door is not unlocked.

Then the switch-over switch 30 is sequentially changed over, and next, the fixed contact 29b is connected to power source 31. Then under the light emission by the light-emitting element 27b, the same operation as mentioned above will be performed. Further, fixed contact 29c is connected to power source 31 and the same operation is performed. In this way, operations are sequentially repeated.

Sometimes plural persons may enter unit areas 28a, 28b, and 28c. Let's assume that, for instance, a person who carries individual card 33b and another person carrying individual card 33d enter unit area 28b. In such a case, since these two persons don't enter unit area 32 precisely at the same time, signal light from the individual card of the first-entering person is received by light-receiving element 32, and judged by signal processing unit 33.

Figure 15A:
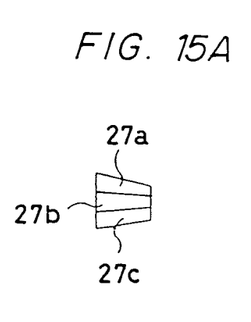

In the above-mentioned embodiment, light-emitting elements 27a, 27b, and 27c of the flat-surface shape were shown, but they could be point-shaped, and when they are point-shaped elements, a cylindrical lens may be used. FIG. 15 shows the shapes of light-emitting elements which correspond to the size of the total light-emitting area 28. When the total light-emitting area 28 is formed by emitting modulated light obliquely from the above over the passage location of the person who carries the individual card, the total light-emitting area 28 becomes narrower at the side near the light-emitting element, and wider at the side away from the light-emitting element. Therefore, more precise judgment will be obtained, if light-emitting elements 27a, 27b, and 27c are arranged so that the entire light-emitting elements will form a trapezoid, as shown in FIG. 15 (a).

Figure 15B:
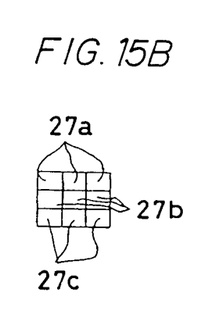

As shown in FIG. 15 (b), these plural light-emitting elements 27a, 27b, and 27c may be arranged into a matrix shape. If the light-emitting section is divided in this way, plural individual cards in a single unit area like individual cards 33b and 33d can receive signal light by time-serialization, and the judgment of the state of individual-card-carrying person dan be made in the same way as above.

The above example shows the case in which the modulated light that irradiates the unit area has been passed through a single lens 26, but it is also all right to provide lenses which correspond to light-emitting elements 7a, 27b, and 27c and to arrange that modulated light will pass through these lenses. Also the numbers of divided unit areas and light-emitting bodies may be arbitrarily increased or decreased. Further, it is possible either to provide separate plural light-emitting elements or to divide the light-emitting surface of a single light-emitting element electrically into plural portions.

Figure 16:
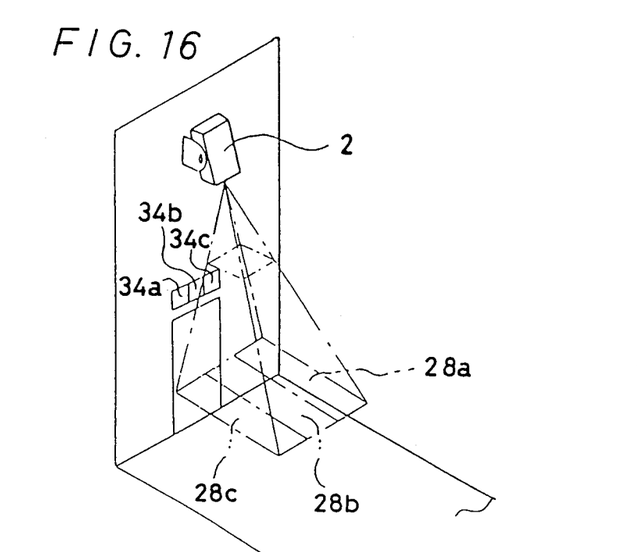

Detector 2 which outputs the request signal to the above-mentioned individual card is installed at the upper part of the door as shown in FIG. 16. Now it is possible to divide the display unit 34 shown in FIG. 13 into display units 34a, 34b, and 34c which correspond to light-emitting elements 27a, 27b, and 27c, respectively, so that these divided display units can display the suitability or unsuitability of the signal light to be sent from the individual card at every time of light emission by light-emitting elements 27a, 27b, and 27c. In such a case, the change-over switch 30 should be interlocked with display units 34a, 34b and 34c.

When an individual-card carrying person enters the divided total light-emitting area in this way, he enters at least any one of the said unit areas. Each unit area is irradiated by an irradiation means at every prescribed time interval, and when the unit area where the individual card exists is irradiated, signal light is emitted from the individual card in question. This signal light is received by the detector, and on the basis of the received-light signal, the said signal processing unit is actuated to confirm the signal, thereby actuating the related equipment which will unlock the door and record the identity of the passer-by. If plural persons enter in such a case, each of these persons will enter any one of the unit areas, where separate signal processing will be performed.

Figure 17:
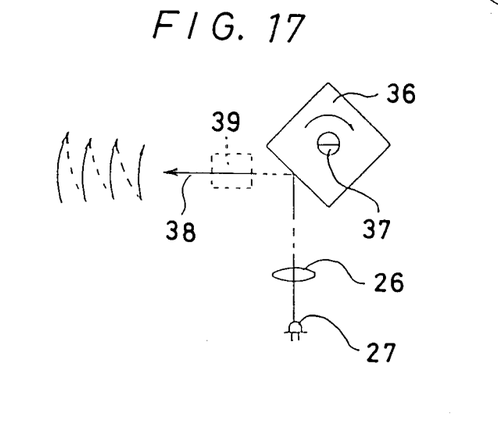
FIG. 17 is a profile showing the case in which a polygon mirror is used as an irradiation means.

FIG. 17 shows the case in which polygon mirror 36, the side of whose cube has been made into a reflecting mirror, is used as the said irradiation means. This polygon mirror 36 is made freely rotatable centering around axis 37 which penetrates the center of the cube, and is so arranged that light emitted from light-emitting element 27 will irradiate the reflecting mirror on the side surface by way of lens 26. Namely, as the polygon mirror 36 rotates, the incident angle of light which falls on its side surface will change, thereby moving the position where the reflected light irradiates. When this reflected light is irradiated on the total light-emitting area 28, a state will occur as if unit areas in the total light-emitting area 28 are sequentially irradiated. Provided that in the case in which the aforesaid light-emitting elements 27a, 27b, and 27c are used, the unit areas are irradiated digitally, whereas in this case, analog irradiation is achieved.

It is also possible to install an optical means 39—which consists of an oscillating or rotating mirror, etc., and is installed at the light path 38 of reflected light as shown by a broken line in the Figure—and to divide the total light-emitting area 28 into unit areas partitioned longitudinally and laterally, as in the case of FIG. 15 (b), by oscillating or rotating this optical means 39 to vibrate the reflected light in the direction perpendicular to the paper surface of the Figure.

Figure 18:
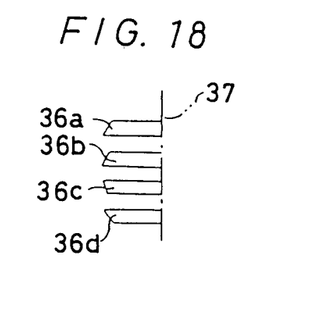
FIG. 18 is an explanation diagram showing an example of improvement on the polygon mirror shown in FIG. 17.

It is further possible to divide the side surface of the polygon mirror into an appropriate number of surfaces as shown in FIG. 18, and to tilt properly the divided surfaces with respect to rotation axis 37 to make them into surfaces 36a, 36b, 36c, and 36d, which will face towards different locations, thereby causing reflected light to move to different locations. This case will become similar to that in which light-emitting elements were arranged into a matrix shape.

It is further possible to replace the polygon mirror 36 with a polygon prism.

Through the use of this embodiment of the present invention, it is possible not only to automatically identify a person or a substance carrying an individual card and to unlock and lock the door, but also, for instance, to find out the number of persons who are present at a specified location, and to use it as a monitor for reserved seats at the theater, thereby immediately locating a miss-seated person.

We claim:

1. An optical card identification system provided with individual cards which have an individual code said cards having means for receiving a request signal from a location remote from said cards requesting a return signal together with means including a power supply for generating and irradiating infrared light modulated by the said individual codes of respective cards in response to said requesting signal while said cards are in transit through a prescribed zone spaced from said source, said system further including a detector which irradiates the said request signal as infrared light from said remote location into said prescribed area and has means for receiving said infrared light transmitted from said individual cards, and thereby detecting the individual code of the latter said cards, and an identifier which identifies the detected individual codes, together with means operative on the basis of the identification results, for actuating terminal equipment related to holders of the said individual cards.

2. The optical card identification system described in claim (1) above, including means whereby each individual card successively emits infrared light in response to said request signal modulated by its said individual code, and the detector includes means for collating and checking the respective emitted modulated, infrared light, 3. The optical card identification system described in claim (2), wherein the individual cards are provided with plural light-emitting elements which emit light having different wavelengths, and these light-emitting elements selectively flicker light having plural wavelengths and emit time-series pulse light containing a combination of wavelengths.

4. The optical card identification system described in claim (3), wherein search individual card has means for connection to an external auxiliary power source.

5. The optical card identification system described in claim 3, wherein an individual card consists of plural light-emitting elements, each emitting different inherent pulse light.

6. The optical card identification system described in claim 1, which features that the detector emits infrared light within the said prescribed area having a solid angle of about ⅓ to ⅔ seradian.

7. The optical card identification system described in claim 1, which features that the detector has its total light-receiving area divided into plural unit areas, possesses plural light-receiving elements corresponding to the respective unit areas, and is provided with a signal processing unit which processes light-receiving signals of the respective light-receiving elements.

8. The optical card identification system described in claim (7) which features that the detector has an irradiation means which irradiates said unit areas at prescribed time intervals, and receives modulated light from the individual cards which lie in any one of the said unit areas.

9. The optical card identification system described in claim 1, which features that said terminal equipment is provided with a display means, which displays information based on identification results.

10. The optical card identification system described in claim 1, including a detecting means for detecting the approaching of an individual card and the detector outputs the request signal when the approaching of the individual card is detected.

11. The optical card identification system described in claim 1, which features that the system has a signal output terminal for transmission of information, which is based on the identification results, to other interfaces such as a telephone exchange.

* * * * *

UNITED STATES PATENT AND TRADEMARK OFFICE
CERTIFICATE OF CORRECTION

PATENT NO. : 4,853,524

DATED : August 1, 1989

INVENTOR(S) : Masami Yamaguchi et al

It is certified that error appears in the above-identified patent and that said Letters Patent is hereby corrected as shown below:

Col. 1, line 24, delete "the individual" (second occurrence) and insert thereinstead --he--;
    line 66, delete "able".

Col. 2, line 42, delete "6" and insert thereinstead --16--.
    line 54, after "Figure" insert a comma.

Col. 3, line 13, delete "detector" and insert thereinstead --detectors--.

Col. 4, line 54, after "detector" insert --2--;
    line 61, after "element" insert --7--;
    line 62, after "received" insert --is--.

Col. 6, line 11, after "area" remove the period.

Col. 7, line 3, after "detector" insert --2--;
    line 54, delete "14" and insert thereinstead --15--.

Col. 8, line 63, delete "by" (second occurrence).

Col. 9, line 51, remove the zero.

Col. 11, line 18, delete "7a" and insert thereinstead --27a--.

UNITED STATES PATENT AND TRADEMARK OFFICE
CERTIFICATE OF CORRECTION

PATENT NO. : 4,853,524

DATED : August 1, 1989

INVENTOR(S) : Masami Yamaguchi, et al

It is certified that error appears in the above-identified patent and that said Letters Patent is hereby corrected as shown below:

Col. 12, line 67, delete "search" and insert thereinstead --each--.

Col. 13, line 8, correct the spelling of "steradium".

Signed and Sealed this

Seventeenth Day of July, 1990

Attest:

HARRY F. MANBECK, JR.

Attesting Officer

Commissioner of Patents and Trademarks